United States Patent [19]
Suzuki

[11] Patent Number: 5,636,060
[45] Date of Patent: Jun. 3, 1997

[54] ZOOM LENS

[75] Inventor: Takeshi Suzuki, Ebina, Japan

[73] Assignee: Nikon Corporation, Tokyo, Japan

[21] Appl. No.: 260,405

[22] Filed: Jun. 14, 1994

[30]  Foreign Application Priority Data

Jun. 24, 1993  [JP]  Japan .................................. 5-177393

[51] Int. Cl.$^6$ .................................................. G02B 15/14
[52] U.S. Cl. ............................................ 359/688; 359/686
[58] Field of Search ................................. 359/683, 686, 359/688, 690, 687, 689

[56]  References Cited

U.S. PATENT DOCUMENTS 4,054,372  10/1977  Schroeder ............................ 359/688
4,659,189   4/1987  Kitagishi ............................. 359/687

*Primary Examiner*—Georgia Y. Epps
*Assistant Examiner*—Dawn-Marie Bey
*Attorney, Agent, or Firm*—Shapiro and Shapiro

[57]  ABSTRACT

A zoom lens includes a first lens group which is fixed during zooming operation and has a positive refracting power, a second lens group which comprises a first movable lens subgroup having a negative refracting power, a second movable lens subgroup having a negative refracting power and a third movable lens subgroup having a negative refracting power or a positive refracting power. The lens groups and the movable lens subgroups are arranged in the above-described order from the object side. The second movable lens subgroup is moved toward an image along an optical axis upon zooming operation from a wide angle side end position toward a tele-side end position, and the first movable lens subgroup and the second movable lens subgroup are relatively close to each other at the wide angle side end position and at the tele-side end position and are distant from each other at an intermediate zooming position.

2 Claims, 2 Drawing Sheets

FIG. 1A
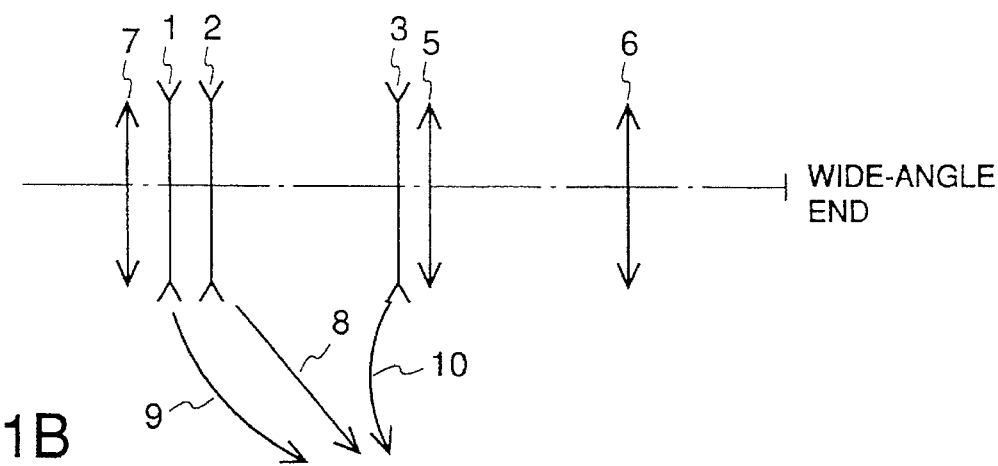
WIDE-ANGLE END
FIG. 1B
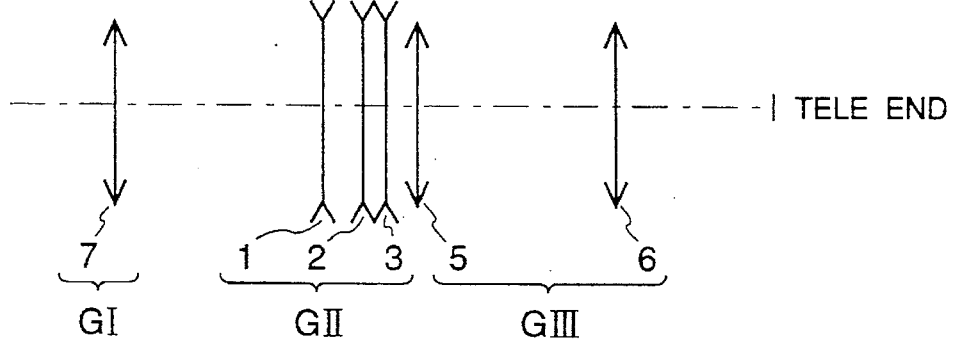
TELE END
↕ : POSITIVE LENS
⋎ : NEGATIVE LENS PRIOR ART
FIG. 2A
PRIOR ART
FIG. 2B
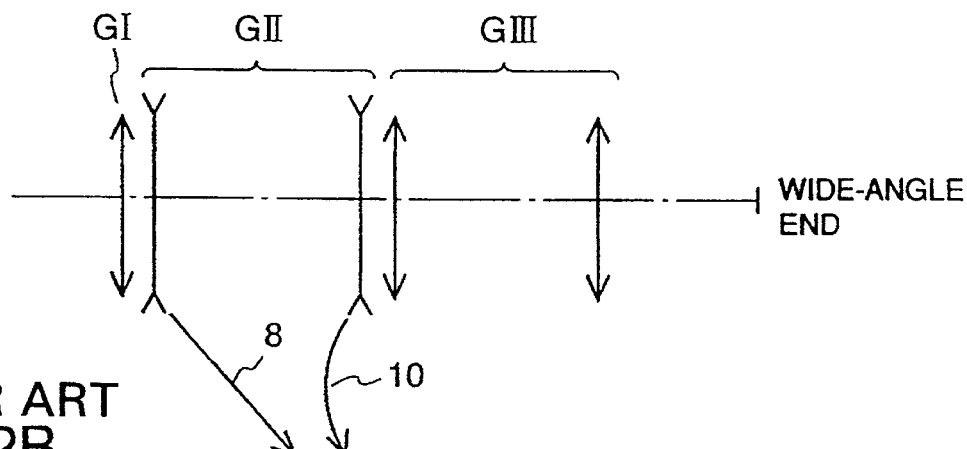
↕ : POSITIVE LENS
⑄ : NEGATIVE LENS

ZOOM LENS

BACKGROUND OF THE INVENTION

1. Field of the Invention

The present invention relates to zoom lenses, and more particularly to a zoom lens used in a television camera or the like having a small size, a light weight, a large aperture and a large zoom ratio.

2. Related Background Art

Recently, a small and light-weight zoom lens having a large aperture and a wide angle has been demanded more and more. Each of most zoom lenses having a large zoom ratio has a four-lens group system comprising a first lens group having positive refracting power, a second lens group having a negative refracting power, a third lens group having a negative or positive refracting power, and a fourth lens group having a positive refracting power, the first to fourth lens groups being arranged in this order from the object side. Zooming operation is effected by moving the second and third lens groups.

In the conventional zoom lens having this structure, it is proposed to increase the refracting power of each lens group in order to enhance the specifications of the zoom lens as well as to reduce the weight or maintain the light weight. When the refracting power of lens groups each having a simple structure is enhanced, various aberrations increase and the performance of the lens groups is lowered.

SUMMARY OF THE INVENTION

The present invention was made in view of the foregoing circumstance and it provides a lens construction in which the principal ray is made close to the optical axis, without increasing the refracting powers of the lens groups, so as to reduce the diameter of the first lens group at the object side. Thus, the present invention provides a zoom lens of reduced size and weight with high performances maintained.

A zoom lens according to the present invention comprises a first lens group having a positive refracting power and that is stationary during zooming operation, a second movable lens comprising a plurality of movable lens groups and a third lens group having a positive refracting power and that is stationary during the zooming operation, the first to third lens groups being arranged in this order from the object side, wherein the second movable lens group comprises a first lens subgroup having a negative refracting power, a second lens subgroup having a negative refracting power and a third lens subgroup having a negative or positive power, the first to third lens subgroups being arranged in this order from the object side, the second subgroup is moved toward an image within the range between the wide-angle side end position and the tele-side end position, the moving loci of the first and second lens subgroups being close to each other at the wide angle side end position and the tele-side end position, and distant from each other at the intermediate zooming position.

In case of a TV zoom lens having a small field angle and a small zoom ratio, the lens diameter of the first lens group at the object side is determined by the height of the principal ray from the optical axis at the wide-angle side end position. In a TV zoom lens having a wide field angle and a large zoom ratio, however, the field angle is the largest at the wide-angle end position. Since the movable lens group for zooming (second lens group) is moved very largely upon the zooming operation in a portion of the zooming range near the wide angle side, the movable lens group for zooming retracts toward the image before the field angle becomes small enough. Thus, the principal ray is separated most largely from the optical axis at an intermediate position between the wide-angle side position and the tele-side end position when the zooming is carried out a little from the wide angle side end position toward the tele-side.

The zoom lens according to the present invention makes such locus movements, that the distances between lenses of movable lens groups are larger at intermediate positions than at the wide angle side end position and the tele-side end position. Thus, movement of moving lens groups for zooming is reduced and the zooming effect is enhanced. Further, the design is such that the first lens subgroup having a negative power can be moved close to the first lens group. In this way, the height of the principal ray can be made low at the zooming position at which the principal ray is separated most largely from the optical axis.

Since the position of the principal ray is made close to the optical axis at the zooming position at which the principal ray is usually separated most largely from the optical axis, the diameter required for the first lens group is small. Reduction of the lens diameter naturally makes the lens thin. Thus, the distances between lens groups become large. This reduces the refracting powers of the lens groups and provides a zoom lens having enhanced specifications and high performance.

The present invention is characterized in that, when the second lens subgroup is moved along a locus from the wide-angle side end position toward the tele-side end position, the moving loci of the first and second lens subgroups are close to each other at the wide angle side end position and at the tele-side end position and are distant from each other at intermediate positions. Accordingly, the distances between the lens groups (e.g., the distance between the first lens group and the second lens group, and/or the second lens group and the third lens group) can be made large.

Let it be that fI, f1 and f2 and $f_s$ are the focal length of the first lens group, the focal length of the first lens subgroup, the focal length of the second lens subgroup and the compound focal length of the first and second lens subgroups at the tele-side end position, respectively. Then, it is preferred that $$|fI| > |f_s| \tag{1}$$

$$|f1/f2| < 50 \tag{2}$$

be satisfied.

These conditions are also applied to the case where the second lens subgroup has a small positive refracting power.

BRIEF DESCRIPTION OF THE DRAWINGS

FIG. 1A shows an arrangement and the refracting power of the lens system of one embodiment of a zoom lens according to the present invention at the wide-angle side end position, wherein the lens system comprises thin lenses;

FIG. 1B shows an arrangement and the refracting power of the lens system of FIG. 1A at the tele-side end position;

FIG. 2A shows an arrangement and the refracting power of the lens system of a conventional zoom lens corresponding to the zoom lens of FIGS. 1A and 1B, at the wide-angle side end position; and FIG. 2B shows an arrangement and the refracting power of the lens system of FIG. 2A at the tele-side end position.

DETAILED DESCRIPTION OF THE PREFERRED EMBODIMENT

An embodiment of the present invention will be described with reference to the accompanying drawings.

FIGS. 1A and 1B show the arrangements and the refracting powers of this embodiment using a lens system of a zoom lens comprising thin lenses. The lens system of this embodiment is at the wide-angle side end and the tele-side end in FIGS. 1A and 1B, respectively. FIGS. 2A and 2B show the arrangements and the refracting powers of the lens system of a conventional zoom lens. The lens system of the conventional zoom lens is at the wide-angle side end and the tele-side end in FIGS. 2A and 2B, respectively. In all Figures, ↑ and ↓ indicate a positive lens and a negative lens, respectively.

As shown in FIGS. 1A and 1B, the zoom lens of this embodiment comprises a first lens group GI which is fixed during zooming operation and has a positive refracting power, a second lens group GII comprising a plurality of movable lens subgroups and a third lens group GIII which is fixed during the zooming operation and has a positive refracting power, the lens groups being arranged in this order from the object side.

In more detail, the second movable lens group GII which perform zooming comprises a first lens subgroup 1 having a negative refracting power, a second lens subgroup 2 having a negative refracting power and a third lens subgroup 3 having a negative refracting power, the lens subgroups being arranged in this order from the object side. The third fixed lens group GIII comprises two lenses 5 and 6 separated from each other by a constant space and has a positive combined refracting power. The first fixed lens group GI comprises a lens 7 having a positive refracting power.

The second lens subgroup 2 moves toward the image along a locus 8 within the range between the wide-angle side end position and the tele-side end position. Likewise, the first lens subgroup 1 moves toward the image along a locus 9 within the range between the wide-angle side end position and the tele-side end position. The loci 8 and 9 are formed such that they are close to each other when the lens system is at the wide-angle side end position and at the tele-side end position and they are distant from each other when the lens system is at an intermediate zooming position. The third lens subgroup 3 is moved on the optical axis, following a moving locus 10 in a state in which the concave surface is directed toward the image.

FIGS. 2A and 2B show the structure of the conventional zoom lens corresponding to the zoom lens of this embodiment according to the present invention. Parts and elements of the conventional zoom similar to those of this embodiment are shown by the same reference numerals. The fundamental structural difference of the conventional zoom lens of FIGS. 2A and 2B from the present embodiment of FIGS. 1A and 1B involves a second movable lens group GII in FIGS. 2A and 2b which comprises a first moveable lens subgroup 4 having a negative refracting power and a second movable lens subgroup 3 having a negative refracting power, the lens subgroups being arranged in this order from the object side.. In the optical point of view, the lens subgroup 4 of FIGS. 2A and 2B corresponds to the combination of the first lens subgroup 1 and the second lens subgroup 2 of FIGS. 1A and 1B when both lens subgroups 1 and 2 are moved together as a unit without changing the distance between them.

The optical parameters, i.e., the focal lengths and the distances between the principal points of the lens groups of the zoom lens according to the present invention were assumed as follows, and the height h of the principal ray of the first lens group GI was obtained.

Focal Lengths fI=77.0 f1=−45.78 f2=−26.89 f3=−41.20 fIII=80.24 where:

fI is the focal length of the first lens group GI;

f1 is the focal length of the first lens subgroup 1 of the second lens group GII;

f2 is the focal length of the second lens subgroup 2 of the second lens group GII;

f3 is the focal length of the third lens subgroup 3 of the second lens group GII; and fIII is the focal length of the third lens group GIII.

The distances between the principal points and the heights of the principal ray at four zoom positions per every distance and every height are listed in Table 1.

TABLE 1

|  | $f = 8.5$ (Wide-Angle Side End) | $f = 20.0$ | $f = 80.0$ | $f = 152.0$ (Tele-side End) |
| --- | --- | --- | --- | --- |
| A1 | −4.397 | 16.127 | 43.346 | 48.561 |
| B1 | 27.286 | 47.810 | 27.286 | 27.286 |
| C1 | 60.544 | 10.900 | 6.363 | 5.588 |
| D1 | 105.248 | 113.843 | 111.686 | 107.246 |
| E1 | 202.807 | 202.807 | 202.807 | 202.807 |
| h | −16.36 | −26.50 | −22.49 | −19.48 | where:

f's are the focal lengths of the zoom lens;

h is the height of the principal ray of the first lens group GI;

A1 is the principal point distance between the first lens group GI and the first lens subgroup 1;

B1 is the principal point distance between the first lens subgroup 1 and the second lens subgroup 2;

C1 is the principal point distance between the second lens subgroup 2 and the third lens subgroup 3;

D1 is the principal point distance between the third lens subgroup 3 and the third lens group GIII; and E1 is the principal point distance between the third lens group GIII and the image surface.

In Table 1, the principal point distance between the first lens group GI and the first lens group 1 is negative at the wide angle side end position. This results from the calculation by assuming that the zoom lens of this embodiment has the same arrangement of the refracting power at the wide-angle side end position as the comparative example of the zoom lens as will be described later, but the first lens group does not collide with the second lens group in the actual zoom lens.

For comparison, the optical parameters, i.e., the focal lengths and the distances between the principal points of the lens groups of the conventional zoom lens as shown in FIGS. 2A and 2B were set as follows, and the height h of the principal ray of the first lens group GI was obtained.

Focal Lengths fI=77.0 f4=−12.13 f3=−41.20
fIII=−80.24
where:

fI is the focal length of the first lens group GI;

f4 is the focal length of the first lens subgroup of the second lens group GII and corresponds to the focal length of the combination of the first lens subgroup 1 and the second lens subgroup 2 when they are moved together as a unit without changing the distance between them;

f3 is the focal length of the second lens subgroup 3 of the second lens group GII; and fIII is the focal length of the third lens group GIII.

The distances between the principal points and the heights of the principal ray at four zoom positions per every distance and every height are listed in Table 2.

TABLE 2

|    | f = 8.5 (Wide-Angle Side End) | f = 20.0 | f = 80.0 | f = 152.0 (Tele-side End) |
|----|-------------------------------|----------|----------|---------------------------|
| A2 | 8.100                         | 33.831   | 55.843   | 61.058                    |
| B2 | 67.883                        | 38.282   | 13.702   | 12.927                    |
| D2 | 105.248                       | 109.119  | 111.666  | 107.246                   |
| E2 | 202.807                       | 202.807  | 202.807  | 202.807                   |
| h  | −16.36                        | −28.63   | −22.49   | −19.48                    | where:

f's are the focal lengths of the zoom lens;

h is the height of the principal ray of the first lens group I;

A2 is the principal point distance between the first lens group GI and the fourth lens subgroup 4;

B2 is the principal point distance between the first lens subgroup 4 and the second lens subgroup 3;

D2 is the principal point distance between the third lens subgroup 3 and the third lens group GIII; and E2 is the principal point distance between the third lens group GIII and the image surface.

In comparison of this embodiment of the present invention with the comparative example, the heights h of this embodiment and the comparative example are −26.50 and −28.63, respectively. It was confirmed, therefore, that the height h of the principal ray is lowered according to the present invention.

The present invention is described by way of an embodiment in which the third lens subgroup of the second lens group GII has a negative refracting power. However, the inventor of the present invention further confirmed that a zoom lens including a third lens subgroup having a positive refracting power attains the similar technical effect.

In the invention, the distance between the first and second lens subgroups becomes the largest at an intermediate zooming position.

As above, in the zoom lens of the present invention, spacing between movable lenses for zooming at an intermediate zoom position is larger than at the wide-angle end telephoto end positions, thereby enabling a zoom lens design in which the principal ray is shifted closer to the optical axis as compared with conventional arrangements, at the zoom position in which the principal ray is usually most distant from the optical axis. The closeness of the principal ray to the optical axis reduces the lens diameter required for first lens group. Therefore, a small and lightweight zoom lens having high performance can be realized.

What is claimed is:

1. A zoom lens which comprises in the following order from an object side:

a first lens group which is fixed during zooming operation and has a positive refracting power;

a second lens group which comprises, in the following order from the object side, a first movable lens subgroup having a negative refracting power, a second movable lens subgroup having a negative refracting power and a third movable lens subgroup; and wherein said second movable lens subgroup is moved toward an image along an optical axis upon zooming operation from a wide-angle side end position toward a tele-side end position, and said first movable lens subgroup and said second movable lens subgroup are closer to one another both at said wide-angle side end position and at said tele-side end position than at an intermediate zooming position.

2. A zoom lens according to claim 1, which satisfies the following conditions:

$$|fIII|>|f_s|;$$

and $$|f1/f2|<50,$$

where:

fI is a focal length of said first lens group;

f1 is a focal length of said first lens subgroup;

f2 is a focal length of said second lens subgroup; and $f_s$ is a compound focal length of said first lens subgroup and said second lens subgroup at said tele-side end position.

* * * * *